United States Patent [19]

Stewart

[11] 4,337,960
[45] Jul. 6, 1982

[54] TROLLEYS

[76] Inventor: Robert M. Stewart, 31 St. Baldreds Rd., North Berwick, East Lothian, Scotland

[21] Appl. No.: 68,128

[22] Filed: Aug. 20, 1979

[51] Int. Cl.³ .............................................. B62B 3/02
[52] U.S. Cl. ............................ 280/47.37 R; 280/47.2
[58] Field of Search ................. 280/40, 47.34, 47.35, 280/47.37 R, 47.2, 47.26, 646, 655, 652, DIG. 6

[56] References Cited

U.S. PATENT DOCUMENTS

| | | | |
|---|---|---|---|
| 1,663,121 | 3/1928 | Dudek et al. | 280/87.02 R |
| 2,709,882 | 6/1955 | Abel | 280/47.37 R |
| 2,784,005 | 3/1957 | Abgarian | 280/DIG. 6 |
| 3,489,426 | 1/1970 | Bond | 280/40 |
| 3,726,536 | 4/1973 | Arino | 280/655 |
| 3,926,448 | 12/1975 | Reichard | 280/DIG. 6 |
| 4,063,612 | 12/1977 | Weiss | 180/195 |
| 4,153,264 | 5/1979 | Pfister | 280/DIG. 6 |

FOREIGN PATENT DOCUMENTS

| | | | |
|---|---|---|---|
| 1031644 | 6/1958 | Fed. Rep. of Germany | 280/47.2 |
| 124981 | 4/1919 | United Kingdom | 280/47.2 |
| 835013 | 5/1960 | United Kingdom | 280/DIG. 6 |
| 1179194 | 1/1970 | United Kingdom | 280/47.34 |

*Primary Examiner*—Robert R. Song
*Assistant Examiner*—Donald W. Underwood
*Attorney, Agent, or Firm*—Krass, Young & Schivley

[57] ABSTRACT

A collapsible trolley suitable for the carriage of golf clubs or the like, including a main frame provided with an elongated handle and a pair of leg members adapted to carry a ground wheel. An auxiliary wheel is carried at the lower end of the main frame and pivot means are provided to permit free swinging movement of the free end of the handle relative to the remainder of the trolley whereby the trolley is supported on the ground wheels and auxiliary wheel on passage of the ground.

4 Claims, 3 Drawing Figures

TROLLEYS

This invention relates to collapsible trolleys and has particular but not exclusive reference to such trolleys for use in the carrying of bags of golfclubs.

Such golf trolleys have previously been proposed consisting of a main frame member having brackets at its upper and lower ends for supporting a bag of golfclubs. Intermediate the ends of the main frame member, a pair of diverging legs are pivotally secured thereto and these legs are provided at their free ends with a pair of ground wheels. Towards the top end of the main frame member, an elongated handle is pivotally secured thereto which when in use extends upwardly and is locked in this position to provide an extension of the main frame member. Adjacent the aforesaid main pivot the handle has pivotally connected thereto a pair of links, the other end of each of which is pivotally secured to respective legs of the trolley. Consequently, the trolley can be collapsed by pivoting the handle about its main pivot to lie alongside and underneath the main frame member. Such movement causes the legs to be drawn inwardly to lie close to and substantially parallel with the main frame member. Previously proposed golf trolleys, as described above, have proved to be very satisfactory in use. There is, however, one disadvantage. When the aforesaid golf trolley is being used to carry golfclubs the weight of the clubs during travel over the ground is supported partially by the ground wheels and partially by the user of the trolley who has to exercise control over the trolley to pivot the main frame member about the ground wheels so that the lower end of the main frame member is clear of the ground. This operation can be tiring to the user particularly when used on hilly terrain.

An object of the present invention is to obviate or mitigate the aforesaid disadvantage.

According to the present invention there is provided a trolley for the carriage of golfclubs or the like comprising a main frame member adapted to support a bag of golfclubs thereon, a pair of leg members secured to said main frame member and each adapted to carry a ground wheel adjacent its free end, an elongated handle connected or connectible to the main frame member, an auxiliary wheel mounted on the underside of the main frame member adjacent the lower end thereof, and first pivot means intermediate the ends of the handle permitting free swinging movement of the free end of the handle relative to the remainder of the trolley whereby the trolley is supported on the ground wheels and auxiliary wheel on passage over the ground.

Preferably, the trolley is a collapsible trolley in which the leg members are pivotally secured to the main frame member and the handle is pivotally mounted relative to the main frame member about second pivot means whereby pivotal movement of the handle about said second pivot means causes collapse of the handle member and the leg members into an out of use position, said first pivot means being located intermediate the ends of the handle member between the second pivot means and the free end of the handle.

An embodiment of the invention will now be described by way of example, with reference to the accompanying drawings in which.

Figures 1, 3:
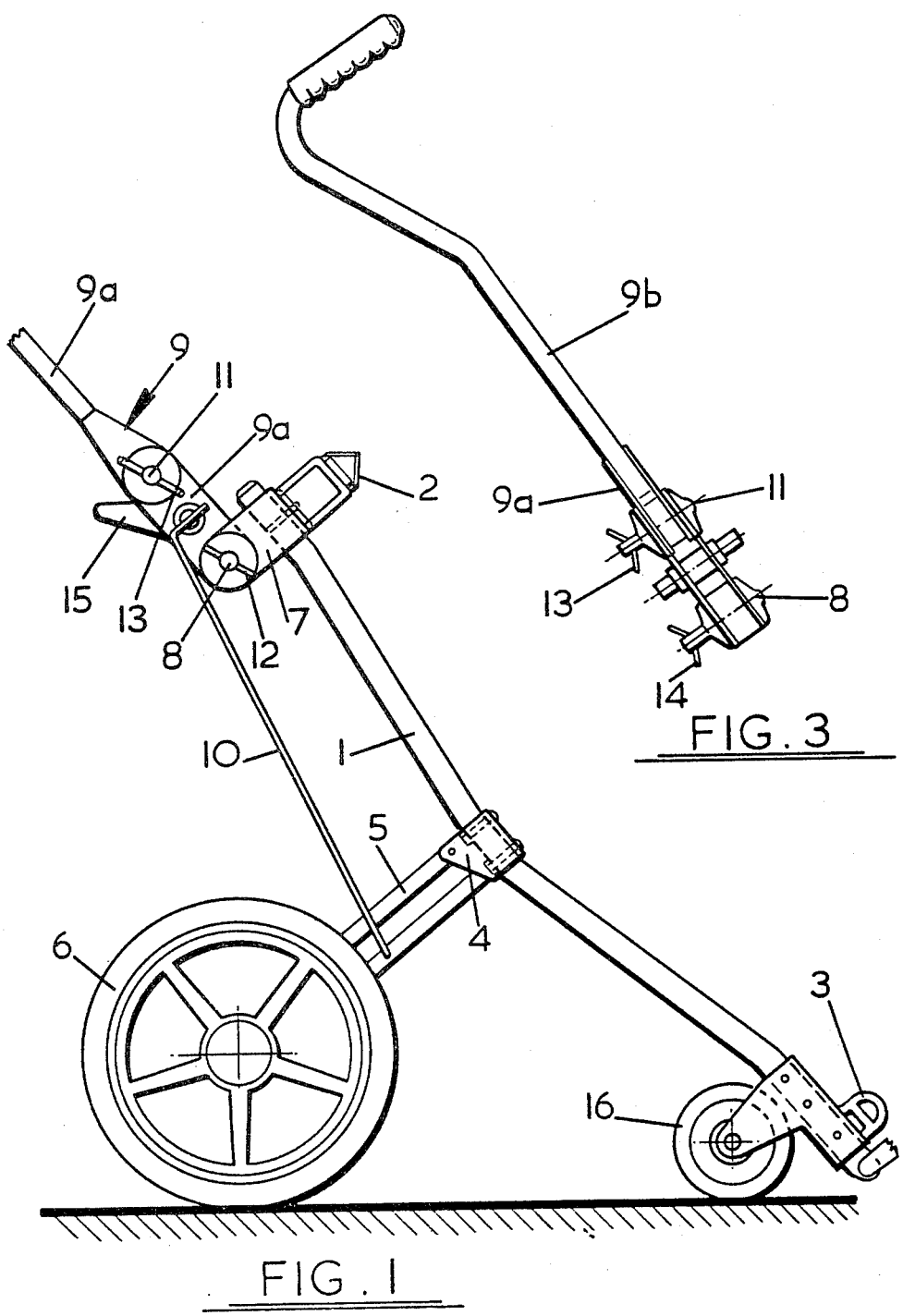
FIG. 1 is a side view of a trolley in accordance with the invention.
FIG. 3 is a detail view of the handle pivot arrangement of the trolley.
Figure 2:
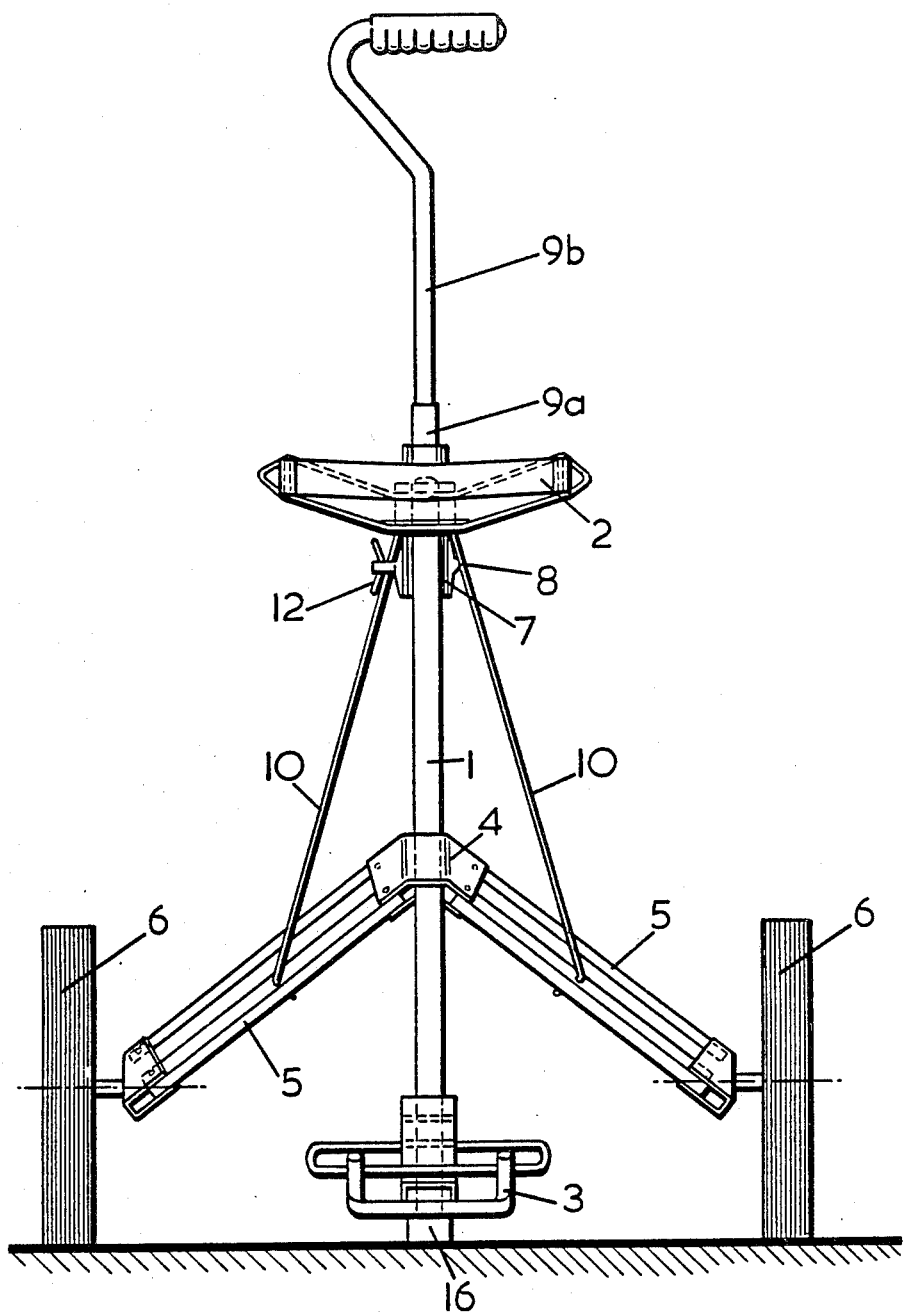
FIG. 2 is an end view of the trolley of FIG. 1.

Referring to the drawings, a trolley for the carriage of golfclubs comprises a main frame member 1, having upper an lower supports 2, 3 respectively for supporting a bag of golfclubs thereon.

Intermediate the ends of the main frame member is a bracket 4 to which a pair of legs 5 are privotally secured so that they extend outwardly and downwardly. The free end of each leg 5 is provided with a ground wheel 6 which can be detachable if desired.

Towards the top end of the main frame member 1, there is provided a bracket 7 which forms a main pivot 8 for an elongated handle 9. Pivotally secured to the elongated handle 9 on each side thereof is a link 10, each of which links extends downwardly to be pivotally secured to one of the legs 5.

The handle 9 is formed in two parts namely, a stem-receiving portion in the form of a bracket 9a which is connected to the main pivot 8 and an elongated stem 9b which can be freely pivotable about a further pivot 11 relative to the bracket 9a.

The handle 9 can be pivotally fixed relative to the bracket 7 and the two handle portions 9a and 9b can be pivotally fixed or locked relative to each other by tightening of clamping wing nuts 12 and 13 respectively.

In normal use, however, it will be appreciated that the wing nut 13 will be loosened sufficiently to allow the handle 9 to pivot freely about pivot 11.

In an alternative arrangement, aligned holes are provided in the bracket 9a and a corresponding hole is provided in the stem 9b so that when the stem is located within the bracket 9a, a locking pin can be passed through the aligned holes to lock the stem 9b relative to the bracket 9a. Conversely the locking pin can be removed from the holes to allow the stem 9b to pivot freely in a vertical plane about the secondary pivot 11.

A stop 15 is secured to the bracket 9a and extends into the path of pivotal movement of the handle stem 9b to prevent its travel below a predetermined limit.

An auxiliary wheel 16 is secured adjacent the lower end of the main frame member 1. The auxiliary wheel 16 is fixed against rotation about a vertical axis.

In use of the golf trolley in accordance with the invention the wing nut 13 can be tightened to lock the bracket 9a to the stem 9b of the handle and in this position the trolley is used in exactly the same way as in previously proposed arrangements and can either be pushed or pulled in this condition with the auxiliary wheel 16 clear of the ground. When the wing nut 13 is slackened, however, the stem 9b of the handle can pivot freely about its pivot 11 so that the weight of the golfclubs causes the main frame member to pivot about the main ground wheels 6 to allow the auxiliary wheel 16 to rest on the ground. Thus, the full weight of the clubs is taken by the two ground wheels 6 and the auxiliary wheel 16. In this condition, therefore, the only force which has to be applied by the user is the force necessary to pull the trolley and he does not require to exert any downward force to maintain the main frame member clear of the ground.

If desired, the auxiliary wheel 16 can be mounted so as to be pivotable about a vertical as well as a horizontal axis but it is thought that an auxiliary wheel which is rotatable only about a horizontal axis is preferable. Also more than one auxiliary wheel can be provided if desired.

Although the above-described invention is particularly applicable to collapsible trolleys, the principle of the vertically freely swingable handle can also be applied to trolleys which are non-collapsible. In this case the main pivot 8 is omitted, the legs 5 are fixed and not pivotal and the interconnecting links 10 are dispensed with.

What I claim is:

1. A collapsible trolley for the carriage of golf clubs or the like comprising a main frame member adapted to support a bag of golf clubs or the like thereon, a pair of leg members pivotally secured to said main frame member and each adapted to carry a ground wheel adjacent its free end, an elongated handle connected to the main frame member, an auxiliary wheel mounted on the main frame member adjacent the lower end thereof, first pivot means intermediate the ends of the handle for permitting free swinging movement of the free end of the handle relative to the remainder of the trolley when in use whereby the trolley is supported on the ground wheels and auxiliary wheel for passage over the ground, second pivot means between said handle and the remainder of said trolley for transmitting force applied on said handle to the remainder of said trolley in order to permit collapse of said trolley, and means for selectively locking said handle against rotation about said first and second pivot means.

2. A trolley as claimed in claim 1 including a stop mounted intermediate the ends of the handle to limit the downward pivotal movement of the handle.

3. A trolley as claimed in claim 1, in which said second pivot means is disposed between said first pivot means and said main frame member.

4. A trolley as claimed in claim 1, including force transmitting link means for connecting said leg members with said handle and secured to said handle between said first and second pivot means.

* * * * *